(12) United States Patent
Wilde et al.

(10) Patent No.: US 11,307,627 B2
(45) Date of Patent: Apr. 19, 2022

(54) SYSTEMS AND METHODS FOR REDUCING STRANDED POWER CAPACITY

(71) Applicant: HEWLETT PACKARD ENTERPRISE DEVELOPMENT LP, Houston, TX (US)

(72) Inventors: Torsten Wilde, Dornach-Aschheim (DE); Andy Warner, Eagan, MN (US); Steven Dean, Chippewa Falls, WI (US); Steven Martin, Plano, TX (US); Pat Donlin, Eagan, MN (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/863,217

(22) Filed: Apr. 30, 2020

(65) Prior Publication Data
US 2021/0341984 A1    Nov. 4, 2021

(51) Int. Cl.
*G06F 1/26* (2006.01)
*G06F 1/3203* (2019.01)
(Continued)

(52) U.S. Cl.
CPC .............. *G06F 1/3203* (2013.01); *G06F 1/30* (2013.01); *G06F 9/5094* (2013.01); *G06Q 50/06* (2013.01);
(Continued)

(58) Field of Classification Search
CPC ........ G06F 1/3203; G06F 1/30; G06F 9/5094; G06Q 50/06; H04L 41/0833
(Continued)

(56) References Cited

U.S. PATENT DOCUMENTS 5,964,879 A * 10/1999 Dunstan ................ G06F 1/3215
                                                        713/320
8,176,498 B2 * 5/2012 Huscroft ............. G06F 9/44505
                                                        719/310
(Continued)

OTHER PUBLICATIONS

Bodas, D. et al., "Simple Power-Aware Scheduler to Limit Power Consumption by HPC System within a Budget," Nov. 16, 2014, https://ieeexplore.ieee.org/document/7016384.
(Continued)

*Primary Examiner* — Volvick Derose
(74) *Attorney, Agent, or Firm* — Hewlett Packard Enterprise Patent Department

(57) ABSTRACT

Systems and methods described herein make previously stranded power capacity (power that is provisioned for a data center according to a computing system's nameplate power consumption but is currently not useable) available to the data center. Systems described herein generate empirical power profiles that specify expected upper bounds for the power consumption levels that applications trigger. Using the upper bounds for application power-consumption levels, a computing system described herein can reliably release part of its provisioned nameplate power for other systems or data center consumers, reducing the amount of stranded power in a data center. The method described herein avoids performance penalties for most jobs by using sensor measurements made at a rapid rate explained herein to ensure that a system power cap based on running application's measured peak power consumption is reliable with reference to the power capacitance inherent in the computing system.

20 Claims, 5 Drawing Sheets

(51) Int. Cl.
*G06F 1/30* (2006.01)
*H04L 41/0833* (2022.01)
*G06Q 50/06* (2012.01)
*G06F 9/50* (2006.01)
*G06F 1/3287* (2019.01)

(52) U.S. Cl.
CPC ........ *H04L 41/0833* (2013.01); *G06F 1/3287* (2013.01)

(58) Field of Classification Search
USPC .......................................................... 713/320
See application file for complete search history.

(56) References Cited

U.S. PATENT DOCUMENTS

| | | | | |
|---|---|---|---|---|
| 9,513,696 | B2* | 12/2016 | Banerjee | G06F 1/329 |
| 9,927,857 | B2* | 3/2018 | Song | G06F 1/3203 |
| 10,128,684 | B2* | 11/2018 | Ramamurthy | H02J 9/062 |
| 2003/0135769 | A1* | 7/2003 | Loughran | H04W 52/0251 |
| | | | | 713/310 |
| 2005/0149940 | A1* | 7/2005 | Calinescu | G06F 9/5061 |
| | | | | 718/104 |
| 2005/0201291 | A1* | 9/2005 | Gluck | G06F 1/3278 |
| | | | | 370/241 |
| 2010/0005326 | A1* | 1/2010 | Archer | G06F 1/32 |
| | | | | 713/320 |
| 2010/0162019 | A1* | 6/2010 | Kumar | H04N 5/63 |
| | | | | 713/323 |
| 2010/0235840 | A1* | 9/2010 | Angaluri | G06F 1/329 |
| | | | | 718/102 |
| 2012/0004782 | A1* | 1/2012 | Koskan | H04L 67/303 |
| | | | | 700/291 |
| 2012/0060170 | A1* | 3/2012 | Vajda | G06F 1/3287 |
| | | | | 718/104 |
| 2012/0110351 | A1* | 5/2012 | Raju | G06F 1/3203 |
| | | | | 713/300 |
| 2013/0086384 | A1* | 4/2013 | Perez | G06F 1/3209 |
| | | | | 713/175 |
| 2013/0268257 | A1* | 10/2013 | Hu | G06F 11/3062 |
| | | | | 703/22 |
| 2016/0246349 | A1* | 8/2016 | Perry | G06F 9/5094 |
| 2017/0090535 | A1* | 3/2017 | Jeyapaul | G06F 1/329 |
| 2019/0212932 | A1* | 7/2019 | Lee | G06F 1/28 |

OTHER PUBLICATIONS

Bugbee, B. et al., "Prediction and Characterization of Application Power Use in a High-Performance Computing Environment," Journal of Statistical Analysis and Data Mining, Feb. 27, 2017, vol. 10, No. 3, https://www.osti.gov/servlets/purl/1361232.

Meyer, N., "Data Centre Infrastructure Monitoring," Partnership for Advanced Computing in Europe, Feb. 21, 2017, http://www.prace-project.eu/IMG/pdf/WP226.pdf.

Patki, T. et al., "Practical Resource Management in Power-Constrained, High Performance Computing," Jun. 2015, pp. 121-132, https://www2.cs.arizona.edu/people/tpatki/hpdc.pdf.

* cited by examiner

US 11,307,627 B2

SYSTEMS AND METHODS FOR REDUCING STRANDED POWER CAPACITY

BACKGROUND

As more data is collected and consumers look to computerized analysis to provide actionable insights about that data, consumer demand for high-performance computing (HPC) systems that can complete trillions of floating-point operations per second (FLOPs) continues to increase. In response to this demand, companies are racing to develop HPC systems that will complete a quintillion FLOPs. In the near future, such HPC systems may consume up to 40 megawatts of power during operation.

BRIEF DESCRIPTION OF THE DRAWINGS

Various features and advantages will become apparent from the following description, given by way of example only, which is made with reference to the accompanying drawings, of which.

DETAILED DESCRIPTION

Figure 1:
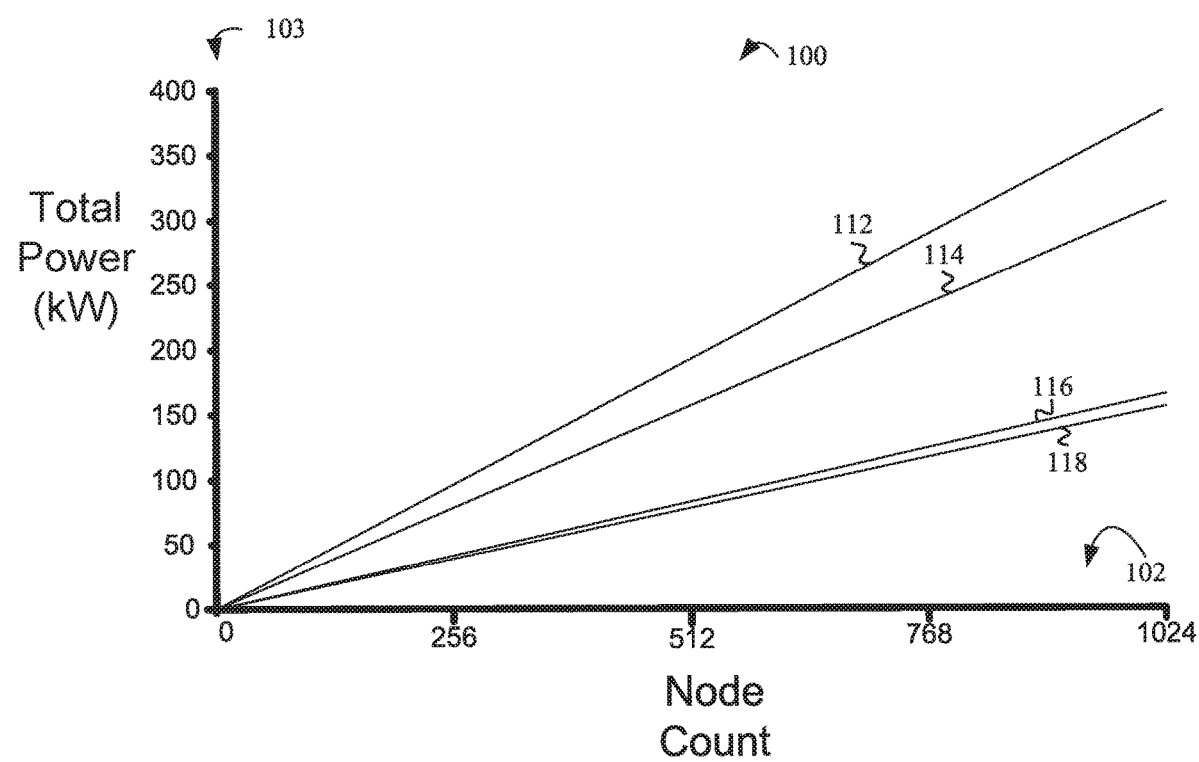
FIG. 1 is a graph that illustrates some predicted and observed power-consumption rates for two benchmarking applications on a computing system, according to one example.

In data centers (e.g., HPC data centers), a cluster typically comprises tens, hundreds, or even thousands of computing nodes. Collectively, these nodes can consume tens of megawatts of power—much more than electrical utility providers and city regulators, architects, and builders might expect from other types of light business institutions housed in buildings of comparable square footage. As a result, when aspiring to create a new data center, companies generally have to decide upon how much power to provision to a datacenter early in the planning stage so that sufficient infrastructure for supporting the anticipated level of power consumption can be installed and proper authorization can be secured from regulators and power vendors. In general, the costs associated with running the data center increase as the amount of power provisioned increases. Furthermore, it may be prohibitively expensive (e.g., due to equipment upgrade costs, increased power costs, etc.) to increase the amount of power provisioned for a data center after the data center has already been erected. Thus, it is prudent to estimate how much power a data center will be expected to consume carefully before deciding how much power to provision for the data center.

There are many components within a data center that consume power during normal operation. Some of these components, such as lighting and air conditioning, are external relative to the computing systems in the data center. Other components, such as cooling fans, fluid pumps (for liquid-cooled systems), memory (e.g., dynamic inline memory modules (DIMMs), storage devices (e.g., solid state drives), and network interface cards (NICs), are positioned either within the nodes (e.g., servers) or the computing system (e.g., racks that contain the nodes). The processors in the nodes often consume a particularly large percentage of the total power consumed by the computing system. Thus, to estimate the total power consumption of a computing system and, by extension, a data center accurately, it is desirable to estimate the amount of power that the processors contained within the nodes of the computing system will consume.

As used herein, the term "node" refers to a computing system that includes at least one processor core and memory (e.g., found in one or more dynamic inline memory modules) that is used to execute at least one instance of an operating system while the node is in operation. Some nodes may have additional components, such as graphics processing units (GPUs). A node may be, for example, a rack server (which may have its own power supply, cooling fans, etc.) or a blade server (which generally shares a power supply and cooling infrastructure with other blade servers).

There are a number of ways to estimate how much power the processors in a node may be expected to consume. For example, manufacturers provide consumers with the thermal design power (TDP) for each different processor those manufacturers produced. The TDP for a processor may be considered the highest (estimated) rate at which the processor that is properly coupled to properly functioning cooling infrastructure (e.g., a heat sink with a fan or a hot plate with a fluid pump) can consume power without overheating and self-immolating (i.e., causing heat damage to silicon or another component of the processor). One way to estimate the total amount of power that the nodes in a data center will consume is to calculate a sum of the TDPs of the processors in the nodes and add this sum to a static estimate for the amount of power that the other elements present in the computing system, such as network components (e.g., network interface cards), storage devices, cooling components (e.g., fans and pumps), other information-technology (IT) components, and power conversion losses will consume. The static estimate for the amount of power consumed by the other elements in the computing system may be provided manually by an administrator, calculated by summing the wattage ratings of the other components, or determined by some other approach (e.g., observation). The sum of the TDPs of each individual processor in the data center plus the static estimate for the other components and for power conversion losses will be referred to herein as the "nameplate power" for the computing system.

In practice, however, the nameplate power tends to overestimate the amount of power that nodes will consume when performing a single job requested by a user. Even benchmarking applications that are designed to use processor-intensive, non-representative workflows to measure the computational-speed limits of HPC systems do not generally cause nodes to consume nameplate power. Applications that are more representative of actual user workflows can cause nodes to consume significantly less than the nameplate power. Thus, if the nameplate power is provisioned for a computing system in the data center, the data center will typically use less than the amount of power provisioned. The difference between the power provisioned for a specific computing system in a data center and the actual power consumed by the computing system during a given job can be referred to as "stranded power capacity"—power that is reserved due to nameplate power provisioning, but is not available for use. Stranded power capacity amounts to a suboptimal use of purchased, available resources. Thus, it is advantageous to reduce stranded power capacity so that additional data-center resources that can be put to use, thereby increasing the return-on-investment for an institution that finances the data center's operation.

Systems and methods described herein reduce stranded power capacity and facilitate more efficient use of available resources in a data center. Systems described herein apply methods described below to create power profiles empirically for applications used to perform jobs on a computing system in the data center. A power profile for an application can include a power-consumption-rate upper bound for that application. This power-consumption-rate upper bound for an application is the peak rate of power consumption observed on the computing system when a representative test job that uses the application is performed on the computing system. Sensors in the computing system repeatedly measure and report the instantaneous rates of power consumption observed during the test job. There is generally a lag time between when spike in power consumption actually occurs in one or more nodes of the computing system and when that spike becomes detectable outside the computing system (also referred to as system power capacitance). The system power capacitance may be determined by observation (e.g., by calculating an average difference between a timestamp at which a sensor reading is actually taken and a timestamp at which the computing system level monitoring detected the spike that commenced with the sensor reading). The time interval between consecutive sensor readings (node power monitoring frequency) in a time series needs to be less or equal to half the observed system power capacitance (e.g if the system power capacitance is 10 ms, then the power measurements during an application run need to be at least every 5 ms or faster) to ensure that the maximum power observed is in fact the maximum power consumption a system level monitoring will detect at any given time. The compute system level power cap can therefore be set below the nameplate power (that is provisioned for the specific computing system by the data center) such that that the freed up power (nameplate power minus maximum system power according to running application) can be used elsewhere in the data center. In practice, if the power cap is set in the manner described in further detail below, performance generally should not be impacted because no application should trigger a power-consumption rate that exceeds the power cap. Thus, though a power cap is in place, active enforcement of the power cap is generally unnecessary. This circumvents the performance penalty that active power capping can cause.

Using the power-consumption-rate upper bounds stored in the power profiles, the sensor readings, and a predefined power-consumption threshold (the quotient that results from dividing the power cap by the number of computing nodes executing the application(s)), the systems described herein strategically schedule jobs concurrently in a manner that limits the stranded power in the computing system and enables other data center consumers to harnesses the freed up power. This ensures that power that would be stranded do to name-plate power provisioning can be used elsewhere in the data center in a manner that ensures that the rate of power consumption in the data center will not elevate to an unacceptable level.

FIG. 1 is a graph 100 that illustrates some predicted and observed power-consumption rates for two benchmarking applications on a computing system, according to one example. The units of the horizontal axis 102 are nodes, while the units of the vertical axis 103 are kilowatts (kW). Specifically, each of the lines 112, 114, 116, and 118 represents a respective series of power-consumption rate plotted against a number of nodes (e.g., used during an actual experiment if respective rate was observed or used as a parameter in calculations if the respective rate was predicted). The computing system used to generate the data shown in FIG. 1 is the SuperMUC located at the Leibniz-Rechenzentrum Supercomputing Centre (LRZ) of the Bavarian Academy of Sciences in Garching, Germany (near Munich). The suffix MUC is the code assigned to the Munich airport by the International Air Transport Association (IATA).

Line 112 represents the nameplate power of the example computing system (i.e., the sum of the TDPs of the processors found in the nodes of the computing system plus the static estimate for the other elements). Line 114 represents the power-consumption rates observed when a portable implementation of the Linpack Highly Parallel Computing benchmarking application (HPL) was executed on the computing system. HPL is typically used to determine the rankings of HPC systems for the "Top 500" list of HPC systems in the world. Line 116 represents the predicted power consumption rates for an additional benchmarking application (EPOCH), while line 118 represents the observed power consumption rates for EPOCH. For reasons beyond the scope of this disclosure, EPOCH may be more representative of how applications that perform actual consumer jobs behave than HPL.

As shown, when 1,024 nodes are in use, the difference between line 112 (the power-consumption rate defined by the nameplate power) and line 114 (the observed power-consumption rates for HPL) is approximately 71 kW. Furthermore, the difference between line 112 and line 118 (the observed power consumption rates for EPOCH) is approximately 229 kW. Thus, if EPOCH is truly representative of how applications that perform actual consumer jobs behave, about 229 kW of power capacity may be stranded when a typical consumer job is performed on the computing system. Since the value of line 118 at 1,024 nodes is only about 167 kW, the amount of stranded power capacity may exceed the amount of power that is actually being consumed while a job is performed in the computing system. Thus, stranded power capacity may amount to a significant waste of available power resources in the data center. As explained in further detail below, systems described herein provide ways to reduce the amount of stranded power capacity significantly.

Figure 2:
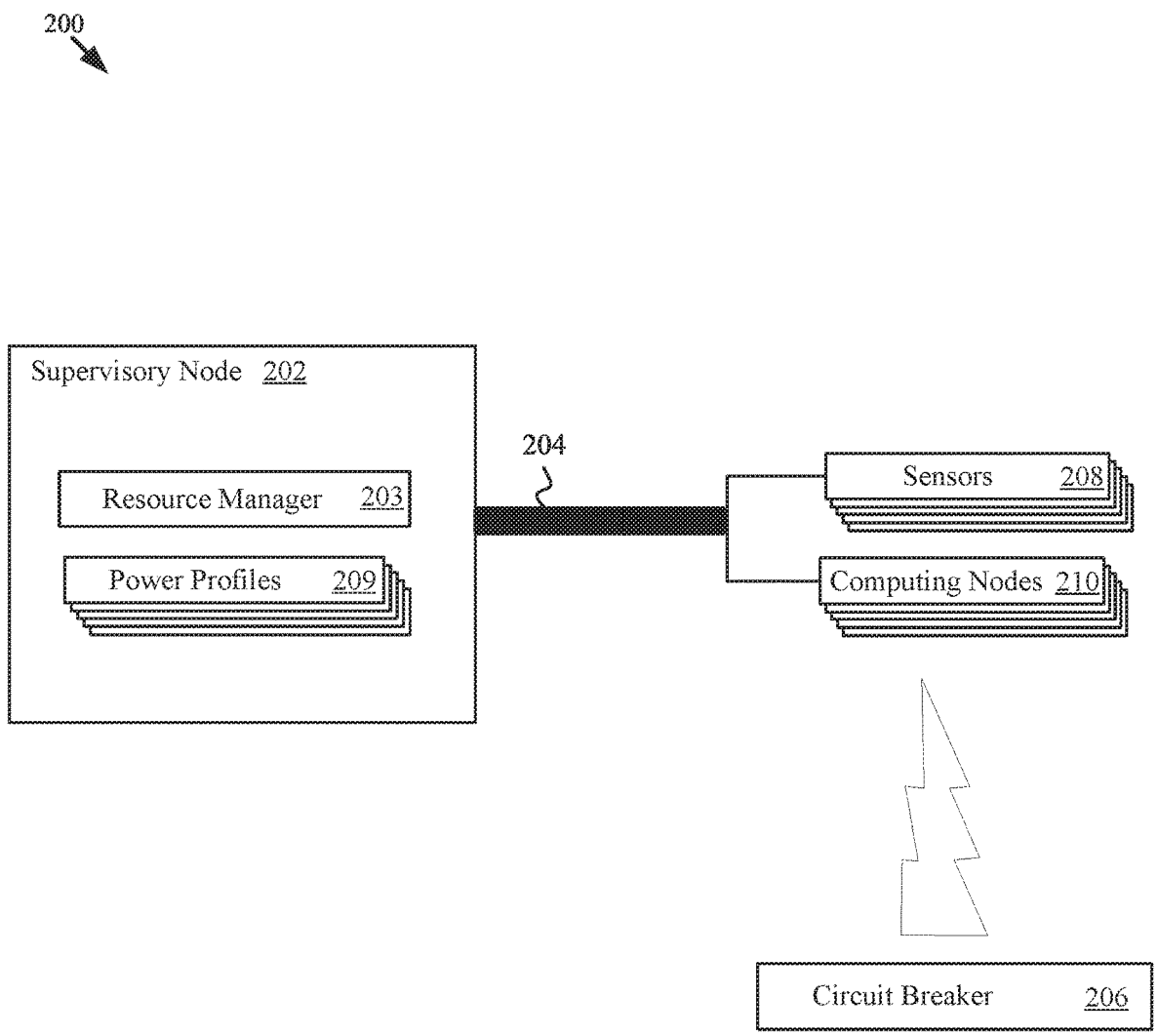
FIG. 2 illustrates a computing environment in which systems described herein can operate, according to one example.

FIG. 2 illustrates a computing environment 200 (e.g., a cluster) in which systems described herein can operate, according to one example. As shown, the computing environment 200 may include a supervisory node 202 (e.g., a computing node with a specialized role in the computing environment, such as a head node or a login node), a network interconnect 204, and computing nodes 210. The supervisory node 202 and the computing nodes 210 receive electrical power routed ultimately through a circuit breaker 206. The sensors 208 (e.g., amperage sensors) can be used to measure power consumption rates of the computing nodes 210, respectively.

The supervisory node 202 executes a resource manager 203 (e.g., a job scheduler) that allocates computing resources (e.g., the computing nodes 210) to perform user-requested jobs over time. In one example, users can login to the supervisory node 202 via a network and request that a job be performed by submitting a command-line script (e.g., a Linux shell script).

As used herein, a "job" refers to a finite set of computing tasks to be performed by the computing nodes 210. Those tasks are typically performed by at least one software application specified in the job request. Since the set of tasks for a job is finite, a job is completed once the tasks in the set have been performed. In other words, the job will have an end time. A job may be contrasted with a computing service (e.g., website hosting) that generally does not have a definite end time that can be projected beforehand.

The supervisory node 202 also has access to power profiles 209 for applications (e.g., applications that are used to perform jobs). Each of the power profiles 209 maps to a specific application and comprises a power-consumption-rate upper bound for that application. The power-consumption-rate upper bound represents a rate at which an individual compute node can be expected to consume power while the application to which the power profile maps is executed on the individual node. The power-consumption-rate upper bound found in each of the power profiles 209 can be determined empirically, as described in greater detail below.

Initially, the supervisory node 202 causes a benchmarking application such as HPL or a processor stress utility application such as FIRESTARTER to be executed on each of the computing nodes 210 that is to be used for performing jobs. While the benchmarking application runs on the computing nodes 210, the sensors 208 measure how much power each of the computing nodes 210 consumes. As described above, the sensors 208 can take sensor readings in a time series such that the time interval between consecutive sensor readings in the time series is no more than half of the lag time that it takes for a spike in power consumption to be detected at the system level (for example, at a supervisory node) 202. As a result of manufacturing variability, two nodes that have identical hardware may consume slightly different amounts of power while executing the benchmarking application. For this reason, the power consumption rate of each the computing nodes 210 is measured individually.

Once the rates of power consumption for the computing nodes 210 have been determined, the resource manager 203 (or another software module associated therewith) identifies the highest power-consumption rate observed for any of the computing nodes 210 during execution of the benchmarking application (or processor stress utility application). The resource manager 203 can store this highest rate as the power-consumption-rate upper bound in one of the power profiles 209 that maps to the benchmarking application (or processor stress utility application). In general, the benchmarking application (or processor stress utility application) may be expected to cause the computing nodes 210 to consume more power during execution than other applications. Therefore, the resource manager 203 can also store this highest rate as a default power-consumption-rate upper bound that can be used for applications for which no power profile currently exists. The resource manager 203 may also set a power cap for the computing environment 100 equal to this highest rate multiplied by the number of computing nodes 210.

The resource manager 203 performs a similar process to define the power-consumption-rate upper bounds for each of the power profiles 209. Specifically, to create a power profile for a particular application, the resource manager 203 causes that application to be executed (e.g., to perform a test job) on each of the nodes 210. While the application runs on the computing nodes 210, the sensors 208 measure how much power each of the computing nodes 210 consumes. Once the rates of power consumption for the computing nodes 210 have been determined, the resource manager 203 identifies the highest power-consumption rate observed for any of the computing nodes 210 during execution of the application.

The resource manager 203 stores this highest rate as the power-consumption-rate upper bound in the power profile for the application.

Note that, in some examples, the power-consumption-rate upper bound may be defined as something other than the highest observed power-consumption rate. For example, the power-consumption-rate upper bound may also be set to a value that is a percentile (e.g., $99^{th}$ $90^{th}$ etc.) of the distribution of observed power-consumption rates (e.g., to exclude outliers). In some examples, the power profile for an application may include multiple statistics for the power-consumption rates observed on the computing nodes 210 during execution of the application, such as the mean, the median, the mode, and the minimum.

Once the power profiles 209 have been created, the resource manager 203 can use the power-consumption-rate upper bounds stored therein to schedule jobs to be performed by the computing nodes 210 in a manner that reduces stranded power capacity.

For example, suppose a several jobs to be performed by the computing nodes 210 are received from users (e.g., via shell scripts) who have logged into the supervisory node 202. Initially, the jobs can be placed in a priority queue (or some other data structure). Also suppose that each job is to be executed by a respective application. The resource manager 203 may proceed by identifying a currently queued job that has a higher priority than the other jobs in the queue (i.e., the first-priority job). The resource manager 203 retrieves the power-consumption-rate upper bound for this first-priority job from a power profile (found in the power profiles 209) for the application that will be used to execute the first-priority job.

To check preemptively for an error, the resource manager 203 may verify that the power-consumption-rate upper bound identified for the first-priority job is less than or equal to the predefined power-consumption threshold for the computing nodes 210 that was defined previously.

The resource manager 203 also identifies a second currently queued job (i.e., the second-priority job) that has a higher priority than the other jobs in the queue except for the first-priority job. The resource manager 203 retrieves the power-consumption-rate upper bound for the second-priority job from a power profile (found in the power profiles 209) for the application that will be used to execute the second-priority job. Again, to check preemptively for an error, the resource manager 203 may verify that the power-consumption-rate upper bound identified for the second-priority job is less than or equal to the predefined power-consumption threshold for the computing nodes 210.

Next, the resource manager 203 calculates the sum of the power-consumption-rate upper bound identified for the first-priority job and the power-consumption-rate upper bound identified for the second priority job. If the sum does not exceed the power-consumption threshold, the resource manager 203 signals the computing nodes 210 to perform the first-priority job and the second-priority job concurrently. However, if the sum exceeds the power-consumption threshold, the resource manager 203 may identify a third-priority job, retrieve the power-consumption-rate upper bound for the third-priority job from one of the power profiles 209 for the application that will be used to execute the third-priority job, and calculate the sum of the power-consumption-rate upper bound identified for the first-priority job and the power-consumption-rate upper bound identified for the third priority job. If the sum of the power-consumption-rate upper bounds identified for the first-priority job and the third priority job does not exceed the power-consumption threshold, the resource manager 203 signals the computing nodes to perform the first-priority job and the third-priority job concurrently. Otherwise, the resource manager 203 can repeat the process of identifying the next-priority job in the queue, retrieving a power-consumption-rate upper bound for the next-priority job, calculating the sum of the power-consumption-rate upper bound identified for the first-priority job and the power-consumption-rate upper bound for the next-priority job, and comparing the sum to the power-consumption threshold until a next-priority job that can be performed by the computing nodes 210 concurrently with the first job without exceeding the power-consumption threshold is identified. When such a next-priority job is identified, the resource manager 203 signals the computing nodes 210 to perform the next-priority job concurrently with the first-priority job.

More generally, let J represent the set of jobs in a job queue and let $j_1, j_2, \ldots, j_n$ represent the jobs in J, where n jobs are in the queue and the subscript of each job represents the position of that job in the queue (i.e., such that $j_1$ has the highest priority of the jobs in J and $j_n$ has the lowest priority of the jobs in J). Let C represent the subset of jobs in J that the resource manager 203 will signal the computing nodes 210 to perform concurrently. If C is empty (e.g., initially), the resource manager 203 begins by adding $j_1$ to C. Next, for each job $j_i$ (successively and in ascending order relative to the subscript, where i is an integer from 2 to n, inclusive), the resource manager 203 determines the sum of the power-consumption-rate upper bound for the application that will execute $j_i$ and the power-consumption-rate upper bounds for the applications that will execute the jobs $j_1, \ldots, j_{i-1}$ that are currently in C. If the sum exceeds the power-consumption threshold, the resource manager 203 excludes $j_i$ from C. Otherwise, the resource manager 203 adds $j_i$ to C. Thus, depending on the power-consumption-rate upper bounds for the applications that will execute the jobs in J and on the power-consumption threshold, C may ultimately include as many as n jobs (e.g., all the jobs in J), as few as one job (e.g., $j_1$ alone), or any number of jobs between one and n. Regardless of how many jobs are included in C, though, the resource manager 203 signals the computing nodes 210 to perform the jobs in C concurrently.

In some examples, the jobs in C may have different starting times and different ending times. When a job $J_x$ in C is completed (where x is the subscript of the completed job), the resource manager 203 removes $j_x$ from C and from J. Next, the resource manager 203 repeats the process described for job $j_i$ above, for each job that is in the subset J-C (i.e., jobs that are currently in J, but are not currently in C).

Persons of skill in the art will recognize that functionality attributed to the resource manager 203 in FIG. 2 may be performed by software modules that are executed on the supervisory node 202, the computing nodes 210, or any combination thereof.

Figure 3:
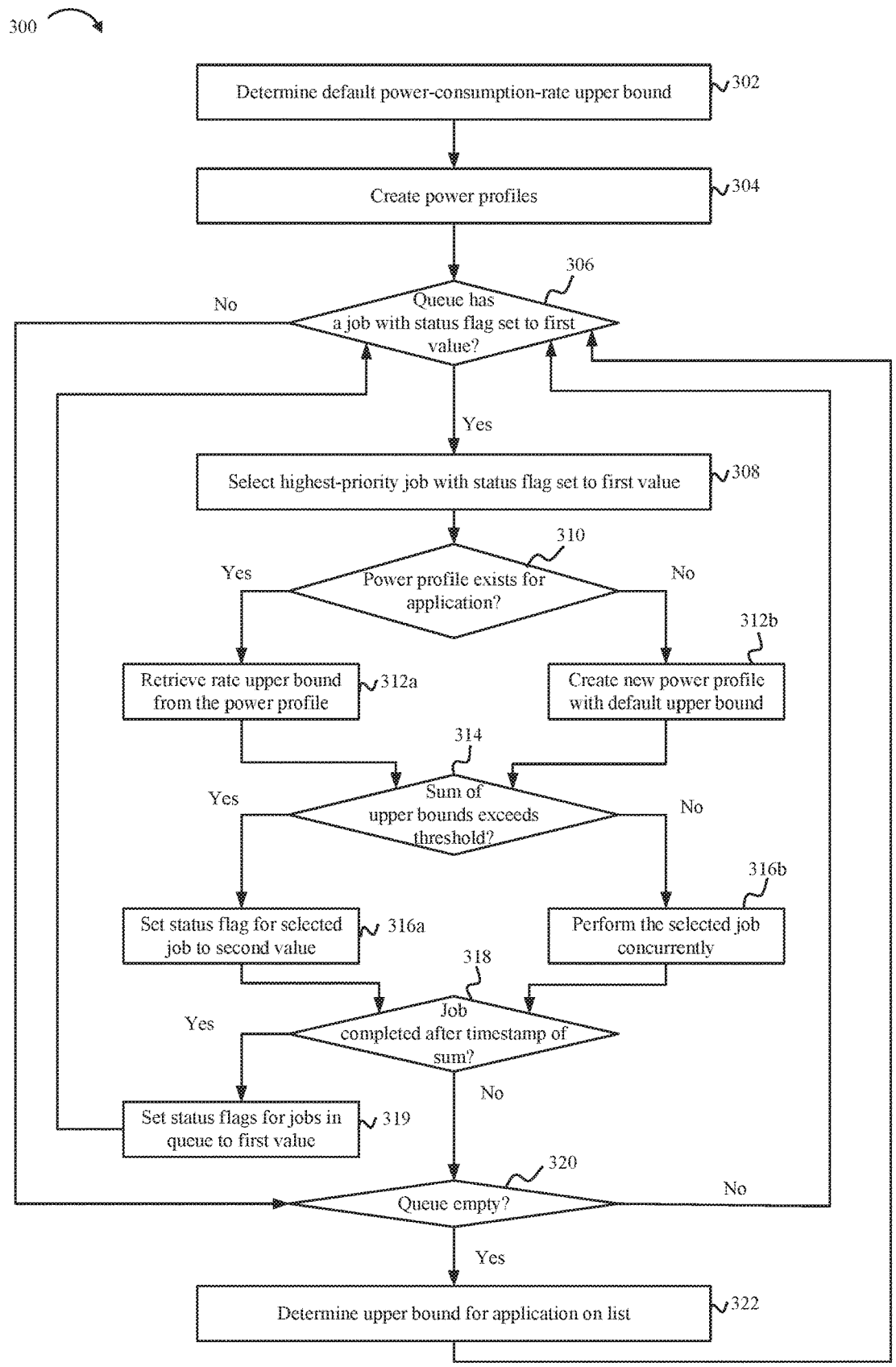
FIG. 3 is a diagram that illustrates a flow of operations for systems described herein, according to one example.

FIG. 3 is a diagram 300 that illustrates a flow of operations for systems described herein, according to one example. A cluster of nodes (e.g., comprising computing nodes and a supervisory node) may apply the flow shown in FIG. 3.

At block 302, a default power-consumption-rate upper bound is determined. The default power-consumption-rate upper bound may be determined by executing an instance of benchmarking application (or some other computationally intensive application) on each node, respectively, in a cluster of nodes. Sensors measure the rates at which each node consumes power while executing the benchmarking application and report the measurements to a supervisory node. The supervisory node sets the default power-consumption-rate upper bound equal to the highest power-consumption rate that was measured while the nodes executed the benchmarking application.

At block 304, power profiles are created for a set of applications that are expected to be used to perform upcoming jobs. For example, if a log of jobs that have been previously performed is available, a power profile may be created for the applications that were used to perform those previous jobs. Each power profile maps to a respective application and includes at least one power-consumption-rate upper bound for the respective application. The power-consumption-rate upper bound for the respective application may be determined by executing an instance of the respective application on each node, respectively, in the cluster of nodes. Sensors measure the rates at which each node consumes power while executing the respective application and report the measurements to a supervisory node. The supervisory node sets the power-consumption-rate upper bound for the respective application equal to the highest power-consumption rate that was measured while the nodes executed the respective application.

At block 306, a queue of requested jobs is checked for any jobs for which a status flag is set to a first value (e.g., a Boolean value such as "true"). If there are none, the flow of diagram 300 proceeds to block 320. Otherwise, the flow of diagram 300 proceeds to block 308.

In one example, newly requested jobs can be added to the queue in parallel with any of the actions described in diagram 300. When a new job is added to the queue, the status flag for the new job is set to the first value by default.

At block 308, the highest-priority job in the queue for which the status flag is set to the first value is selected.

At block 310, the power profiles are checked to determine whether a power profile exists for an application that will be used to perform the selected job (i.e., the selected application). If such a power profile already exists, the flow of diagram 300 proceeds to block 312a. Otherwise, the flow of diagram 300 proceeds to block 312b.

At block 312a, the power-consumption-rate upper bound for the selected application is retrieved from the existing power profile for the selected application. Alternatively, at block 312b, a new power profile is created for the selected application, the power-consumption-rate upper bound in the new power profile for the selected application is set equal to the default power-consumption-rate upper bound, and the selected application is added to a list of applications for which the power-consumption-rate upper bound is to be determined experimentally.

At block 314, the sum of the power-consumption-rate upper bound for the selected application and the power-consumption-rate upper bounds for applications that are currently being used to perform jobs on the nodes is calculated. A timestamp is updated to reflect when the sum was calculated. If the sum exceeds a predefined power-consumption threshold (e.g., the quotient that results from dividing a power cap for the cluster by the number of nodes in the cluster), the flow of diagram 300 proceeds to block 316a. Otherwise, the flow of diagram 300 proceeds to block 316b.

At block 316a, the status flag for the selected job is set to a second value (e.g., a Boolean value such as "false") and the flow of diagram 300 proceeds to block 306.

Alternatively, in block 316b, the nodes commence performing the selected job concurrently with any other jobs that are also currently being performed by the nodes. The selected job is removed from the queue and the flow of diagram 300 proceeds to block 306.

At block 318, when the nodes complete a job, the time of completion is compared to the timestamp that was updated in block 314. If the timestamp precedes the time of completion, the status flags for the jobs in the queue are set to the first value in block 319 and the flow of diagram 300 proceeds to block 306. Otherwise, the flow of diagram 300 proceeds to block 320.

At block 320, if the queue is empty, the flow of diagram 300 proceeds to block 322. Otherwise, the flow of diagram 300 proceeds to block 306.

At block 322, if the list of applications is not empty, the application that was added to the list first (e.g., before any other applications that are currently on the list) is chosen. The power-consumption-rate upper bound for the chosen application is determined (e.g., in the manner described for block 304 above) and the chosen application is removed from the list. The flow of diagram 300 then proceeds to block 306.

Figure 4:
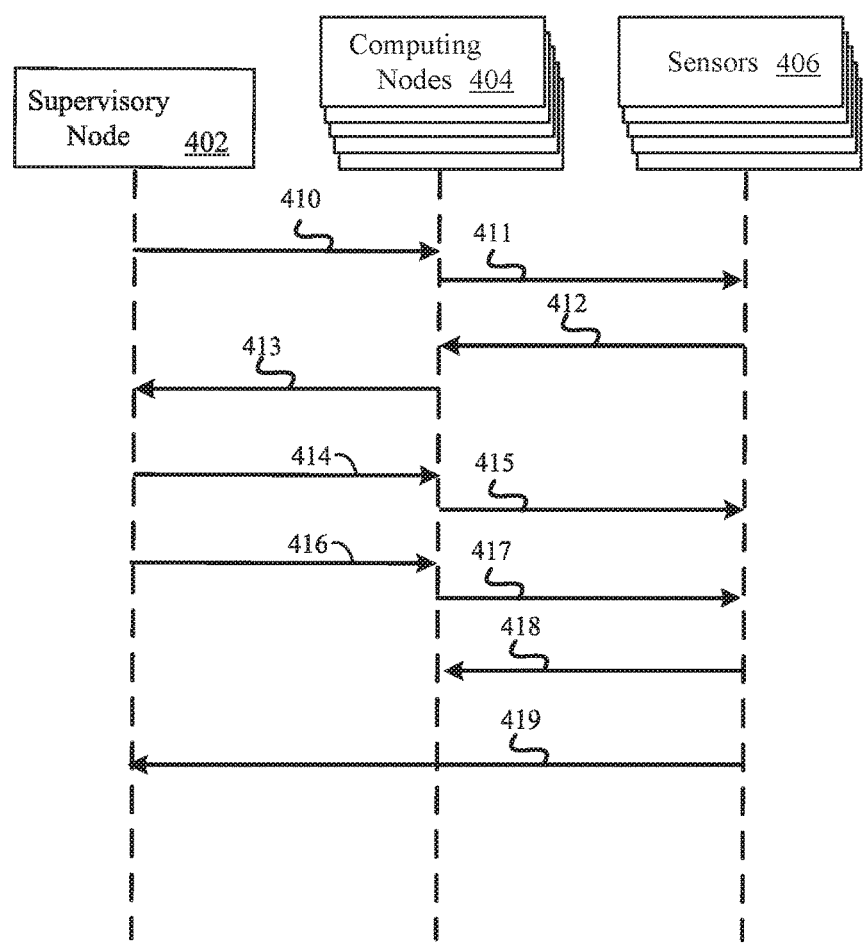
FIG. 4 is a signal diagram that shows a series of communications that may take place in a cluster of computing nodes when methods described herein are applied, according to one example.

FIG. 4 is a signal diagram 400 that shows a series of communications that may take place in a cluster of computing nodes when methods described herein are applied, according to one example. The communications described with respect to FIG. 4 may be sent or received via a high-speed interconnect (e.g., in an HPC system), an Ethernet connection, a wireless connection, or some other type of computer network connection.

At arrow 410, the supervisory node 402 electronically signals the computing nodes 404 to execute an application to complete a test job. The test job is to be performed for the purpose of determining a power-consumption-rate upper bound for the application.

At arrow 411, the computing nodes 404 electronically signal the sensors 406 to measure the rate at which the computing nodes 404 consume power while the job is performed. In other examples, the supervisory node 402 may send this signal to the sensors 406 directly.

At arrow 412, the sensors 406 electronically report the measured power-consumption rates to the computing nodes 404. In other examples, the sensors 406 may report the measured power-consumption rates directly to the supervisory node 402.

At arrow 413, the computing nodes 404 electronically report to the supervisory node 402 that the job has been completed. The computing nodes 404 also electronically report the measured power-consumption rates to the supervisory node 402. Based on the measured power-consumption rates, the supervisory node 402 determines the power-consumption-rate upper bound for the application and stores the power-consumption-rate upper bound in a power profile for that application. Furthermore, if the application is a benchmarking application, the supervisory node 402 may designate the power-consumption-rate upper bound as a default for applications that lack an existing power profile.

The actions performed at arrows 410-413 may be repeated for a plurality of applications to create a collection (e.g., dictionary) of power profiles. Once the default power-consumption rate upper bound has been defined, the actions indicated by arrows 414-418 can be performed.

At arrow 414, the supervisory node 402 electronically signals the computing nodes 404 to perform a first-priority job specified by a first electronic request from a user.

At arrow 415, the computing nodes 404 electronically signal the sensors 406 to measure the rate at which the computing nodes 404 consume power while the first-priority job is performed. In other examples, the supervisory node 402 may send this signal to the sensors 406 directly.

At arrow 416, the supervisory node 402 electronically signals the computing nodes 404 to perform a second-priority job specified by a second electronic request from a user concurrently with the first-priority job.

At arrow 417, the computing nodes 404 electronically signal the sensors 406 to measure the rate at which the computing nodes 404 consume power while the second-priority job is performed. In other examples, the supervisory node 402 may send this signal to the sensors 406 directly.

At arrow 418, the sensors 406 electronically report the power-consumption rates measured during the concurrent performance of the first-priority job and the second-priority job to the computing nodes 404. In other examples, the sensors 406 may report the measured power-consumption rates directly to the supervisory node 402.

At arrow 419, the computing nodes 404 electronically report to the measured power-consumption rates measured during the concurrent performance of the first-priority job and the second-priority job to the supervisory node 402.

Persons of skill in the art will recognize that the order of the communications indicated by arrows 410-419 may vary without departing from the spirit and scope of this disclosure. Furthermore, persons of skill in the art will recognize that an action represented by a single arrow in FIG. 4 may be implemented by multiple communications and that actions represented by multiple arrows in FIG. 4 may be achieved via a single electronic message in some examples.

Figure 5:
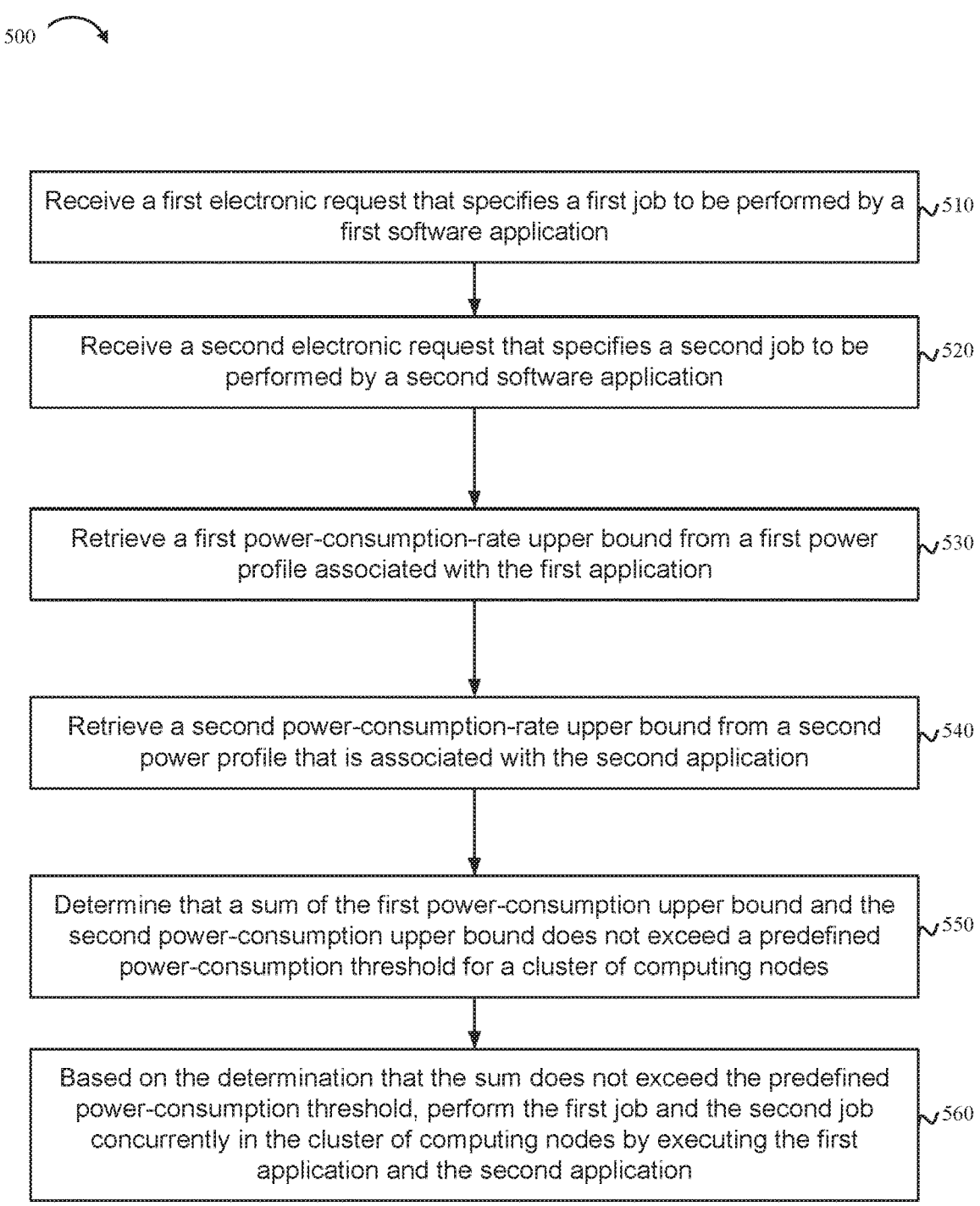
FIG. 5 illustrates functionality for a cluster of nodes as described herein, according to one example.

FIG. 5 illustrates functionality 500 for a cluster of nodes as described herein, according to one example. The functionality 500 may be implemented as a method or can be executed as instructions on a machine (e.g., by one or more processors), where the instructions are included on at least one computer-readable storage medium (e.g., a transitory or non-transitory computer-readable storage medium). While only six blocks are shown in the functionality 500, the functionality 500 may include other actions described herein. Also, some of the blocks shown in the functionality 500 may be omitted without departing from the spirit and scope of this disclosure.

As shown in block 510, the functionality 500 includes receiving a first electronic request that specifies a first job to be performed by a first software application. The first electronic request may be received, for example, via a command-line (e.g., shell) script at a supervisory node for a cluster of computing nodes.

As shown in block 520, the functionality 500 includes receiving a second electronic request that specifies a second job to be performed by a second software application. Like the first electronic request, the second electronic request may be received via a command-line script or some other construct used to submit jobs to be performed in a cluster of computing nodes.

As shown in block 530, the functionality 500 includes retrieving a first power-consumption-rate upper bound from a first power profile associated with the first application. The first power profile may be retrieved from memory or storage at the supervisory node or from some other location in a cluster where power profiles for applications are stored (e.g., memory in another computing node or a network storage device).

In one example, the functionality 500 may also include: performing a first test job by executing the first application on a first individual computing node in the cluster of computing nodes, determining a first rate at which the first individual computing node consumes power while the first test job is performed on the first individual computing node and storing the first rate in the first power profile as the first power-consumption-rate upper bound. In this manner, the first power profile may be created beforehand (e.g., before block 530).

In one example, determining the first rate at which the first individual computing node consumes power comprises collecting a series of sensor readings from a sensor associated with the first individual computing node. A time interval between consecutive sensor readings in the series is no more than half of the computing system power capacitance.

In one example, the first test job is performed while a first processor of the first individual computing node is running at a clock speed that exceeds a clock speed specified by a manufacturer for the first processor (e.g., the first processor is overclocked via a turbo mode while the first test job is performed).

As shown in block 540, the functionality 500 includes retrieving a second power-consumption-rate upper bound from a second power profile that is associated with the second application. Like the first power profile, the second power profile may be retrieved from memory or storage at the supervisory node or from some other location in a cluster where power profiles for applications are stored (e.g., memory in another computing node or a network storage device). In this manner, the second power profile may be created beforehand (e.g., before block 540).

In one example, determining the second rate at which the second individual computing node consumes power comprises collecting a series of sensor readings from a sensor associated with the second individual computing node. A time interval between consecutive sensor readings in the series is no more than half of the computing system power capacitance.

In one example, the second test job is performed while a second processor of the second individual computing node is running in at a clock speed that exceeds a clock speed specified by a manufacturer for the second processor (e.g., the second processor is overclocked via a turbo mode when the second test job is performed).

In one example, the functionality 500 may also include: performing a second test job by executing the second application on a second individual computing node in the cluster of computing nodes; determining a second rate at which the second individual computing node consumes power while the second test job is performed on the second individual computing node; and storing the second rate in the second power profile as the second power-consumption-rate upper bound As shown in block 550, the functionality 500 includes determining that a sum of the first power-consumption upper bound and the second power-consumption upper bound does not exceed a predefined power-consumption threshold for a cluster of computing nodes.

As shown in block 560, the functionality 500 includes, based on the determination that the sum does not exceed the predefined power-consumption threshold, performing the first job and the second job concurrently in the cluster of computing nodes by executing the first application and the second application.

In one example, a feedback loop may be used to update the first and second power-consumption-rate upper bounds if power is consumed at a greater rate than predicted while the first job and the second job are concurrently performed. In particular, the functionality 500 may also include: determining an actual power-consumption rate at which an individual computing node in the cluster consumes power while the first job and the second job are performed concurrently in the cluster and while the first application and the second application are concurrently running on the individual compute node; determining that the actual power-consumption rate exceeds the sum; and updating the first power-consumption-rate upper bound or the second power-consumption-rate upper bound based on the determination that the actual power-consumption rate exceeds the sum.

In some examples, the methodology for updating the upper bound(s) may vary. In one example, updating the first power-consumption-rate upper bound or the second power-consumption-rate upper bound comprises: determining a difference by subtracting the sum from the actual power-consumption rate; adding the difference to the first power-consumption-rate upper bound to determine an updated first power-consumption-rate upper bound; adding the difference to the second power-consumption-rate upper bound to determine an updated second power-consumption-rate upper bound; storing the updated first power-consumption-rate upper bound in the first power profile; and storing the updated second power-consumption-rate upper bound in the second power profile.

In another example, updating the first power-consumption-rate upper bound may comprise: after the first job and the second job have been completed, re-performing the first job by executing the first application on a first individual computing node in the cluster of computing nodes while refraining from executing the second application concurrently with the first application on the first individual computing node; determining an updated first rate at which the first individual computing node consumes power while the first job is re-performed on the first individual computing node; and storing the updated first rate in the first power profile as the first power-consumption-rate upper bound. Similarly, updating the second power-consumption-rate upper bound may comprise: after the first job and the second job have been completed, re-performing the second job by executing the second application on a second individual computing node in the cluster of computing nodes while refraining from executing the first application concurrently with the second application on the second individual computing node; determining an updated second rate at which the second individual computing node consumes power while the second job is re-performed on the second individual computing node; and storing the updated second rate in the second power profile as the second power-consumption-rate upper bound.

In some examples, the functionality 500 may also include: prior to receiving the second electronic request that specifies the second job, receiving an additional electronic request that specifies an additional job to be performed by an additional software application; retrieving an additional power-consumption-rate upper bound from an additional power profile that is associated with the additional application; determining that an additional sum of the first power-consumption upper bound and the additional power-consumption upper bound exceeds the predefined power-consumption threshold for the cluster of computing nodes; and postponing performance of the additional job in the cluster of computing nodes until at least the first job is completed.

While the present techniques may be susceptible to various modifications and alternative forms, the embodiments discussed above have been provided only as examples. It is to be understood that the techniques are not intended to be limited to the particular examples disclosed herein. Indeed, the present techniques include all alternatives, modifications, and equivalents falling within the true spirit and scope of the appended claims.

What is claimed is:

1. A method comprising:
receiving a first electronic request that specifies a first job to be performed by a first software application;
receiving a second electronic request that specifies a second job to be performed by a second software application;
performing a first test job by executing the first application on a first individual computing node in the cluster of computing nodes;
determining a first rate at which the first individual computing node consumes power while the first test job is performed on the first individual computing node;
storing the first rate in a first power profile that is associated with the first application as a first power-consumption-rate upper bound;
retrieving the first power-consumption-rate upper bound from the first power profile associated with the first application;
retrieving a second power-consumption-rate upper bound from a second power profile that is associated with the second application;
determining that a sum of the first power-consumption upper bound and the second power-consumption upper bound does not exceed a predefined power-consumption threshold for a cluster of computing nodes; and
based on the determination that the sum does not exceed the predefined power-consumption threshold, performing the first job and the second job concurrently in the cluster of computing nodes by executing the first application and the second application.

2. The method of claim 1, further comprising, prior to determining the sum:
performing a second test job by executing the second application on a second individual computing node in the cluster of computing nodes;
determining a second rate at which the second individual computing node consumes power while the second test job is performed on the second individual computing node; and
storing the second rate in the second power profile as the second power-consumption-rate upper bound.

3. The method of claim 2, wherein:
the first test job is performed while a first processor of the first individual computing node is running at a clock speed that exceeds a clock speed specified by a manufacturer for the first processor; and
the second test job is performed while a second processor of the second individual computing node is running in at a clock speed that exceeds a clock speed specified by a manufacturer for the second processor.

4. The method of claim 1, wherein determining the first rate at which the first individual computing node consumes power comprises:
collecting a series of sensor readings from a sensor associated with the first individual computing node, wherein a time interval between consecutive sensor readings in the series is no more than half of the computing system power capacitance.

5. The method of claim 1, further comprising:
determining an actual power-consumption rate at which an individual computing node in the cluster consumes power while the first job and the second job are performed concurrently in the cluster and while the first application and the second application are concurrently running on the individual compute node;
determining that the actual power-consumption rate exceeds the sum; and
updating the first power-consumption-rate upper bound or the second power-consumption-rate upper bound based on the determination that the actual power-consumption rate exceeds the sum.

6. The method of claim 5, wherein updating the first power-consumption-rate upper bound or the second power-consumption-rate upper bound comprises:
after the first job and the second job have been completed, re-performing the first job by executing the first application on a first individual computing node in the cluster of computing nodes while refraining from executing the second application concurrently with the first application on the first individual computing node;
determining an updated first rate at which the first individual computing node consumes power while the first job is re-performed on the first individual computing node; and
storing the updated first rate in the first power profile as the first power-consumption-rate upper bound.

7. The method of claim 5, wherein updating the first power-consumption-rate upper bound or the second power-consumption-rate upper bound comprises:
determining a difference by subtracting the sum from the actual power-consumption rate;
adding the difference to the first power-consumption-rate upper bound to determine an updated first power-consumption-rate upper bound;
adding the difference to the second power-consumption-rate upper bound to determine an updated second power-consumption-rate upper bound;
storing the updated first power-consumption-rate upper bound in the first power profile; and
storing the updated second power-consumption-rate upper bound in the second power profile.

8. The method of claim 1, further comprising:
prior to receiving the second electronic request that specifies the second job, receiving an additional electronic request that specifies an additional job to be performed by an additional software application;
retrieving an additional power-consumption-rate upper bound from an additional power profile that is associated with the additional application;
determining that an additional sum of the first power-consumption upper bound and the additional power-consumption upper bound exceeds the predefined power-consumption threshold for the cluster of computing nodes; and
postponing performance of the additional job in the cluster of computing nodes until at least the first job is completed.

9. A system comprising:
one or more processors; and
a memory storing instructions that, when executed on the one or more processors, perform a set of actions, the set of actions comprising:
receiving a first electronic request that specifies a first job to be performed by a first software application;
receiving a second electronic request that specifies a second job to be performed by a second software application;
performing a first test job by executing the first application on a first individual computing node in the cluster of computing nodes;

determining a first rate at which the first individual computing node consumes power while the first test job is performed on the first individual computing node;

storing the first rate in a first power profile that is associated with the first application as a first power-consumption-rate upper bound;

retrieving the first power-consumption-rate upper bound from the first power profile associated with the first application;

retrieving a second power-consumption-rate upper bound from a second power profile that is associated with the second application;

determining that a sum of the first power-consumption upper bound and the second power-consumption upper bound does not exceed a predefined power-consumption threshold for a cluster of computing nodes; and based on the determination that the sum does not exceed the predefined power-consumption threshold, performing the first job and the second job concurrently in the cluster of computing nodes by executing the first application and the second application.

10. The system of claim 9, wherein the set of actions further comprises, prior to determining the sum:

performing a second test job by executing the second application on a second individual computing node in the cluster of computing nodes;

determining a second rate at which the second individual computing node consumes power while the second test job is performed on the second individual computing node; and storing the second rate in the second power profile as the second power-consumption-rate upper bound.

11. The system of claim 10, wherein:

the first test job is performed while a first processor of the first individual computing node is running at a clock speed that exceeds a clock speed specified by a manufacturer for the first processor; and the second test job is performed while a second processor of the second individual computing node is running in at a clock speed that exceeds a clock speed specified by a manufacturer for the second processor.

12. The system of claim 9, wherein determining the first rate at which the first individual computing node consumes power comprises:

collecting a series of sensor readings from a sensor associated with the first individual computing node, wherein a time interval between consecutive sensor readings in the series is no more than half of the computing system power capacitance.

13. The system of claim 9, wherein the set of actions further comprises:

determining an actual power-consumption rate at which an individual computing node in the cluster consumes power while the first job and the second job are performed concurrently in the cluster and while the first application and the second application are concurrently running on the individual compute node;

determining that the actual power-consumption rate exceeds the sum; and updating the first power-consumption-rate upper bound or the second power-consumption-rate upper bound based on the determination that the actual power-consumption rate exceeds the sum.

14. The system of claim 13, wherein updating the first power-consumption-rate upper bound or the second power-consumption-rate upper bound comprises:

after the first job and the second job have been completed, re-performing the first job by executing the first application on a first individual computing node in the cluster of computing nodes while refraining from executing the second application concurrently with the first application on the first individual computing node;

determining an updated first rate at which the first individual computing node consumes power while the first job is re-performed on the first individual computing node; and storing the updated first rate in the first power profile as the first power-consumption-rate upper bound.

15. The system of claim 13, wherein updating the first power-consumption-rate upper bound or the second power-consumption-rate upper bound comprises:

determining a difference by subtracting the sum from the actual power-consumption rate;

adding the difference to the first power-consumption-rate upper bound to determine an updated first power-consumption-rate upper bound;

adding the difference to the second power-consumption-rate upper bound to determine an updated second power-consumption-rate upper bound;

storing the updated first power-consumption-rate upper bound in the first power profile; and storing the updated second power-consumption-rate upper bound in the second power profile.

16. The system of claim 9, wherein the set of actions further comprises:

prior to receiving the second electronic request that specifies the second job, receiving an additional electronic request that specifies an additional job to be performed by an additional software application;

retrieving an additional power-consumption-rate upper bound from an additional power profile that is associated with the additional application;

determining that an additional sum of the first power-consumption upper bound and the additional power-consumption upper bound exceeds the predefined power-consumption threshold for the cluster of computing nodes; and postponing performance of the additional job in the cluster of computing nodes until at least the first job is completed.

17. A non-transitory computer-readable storage medium containing instructions thereon that, when executed on a processor, perform the following set of actions:

receiving a first electronic request that specifies a first job to be performed by a first software application;

receiving a second electronic request that specifies a second job to be performed by a second software application;

performing a first test job by executing the first application on a first individual computing node in the cluster of computing nodes;

determining a first rate at which the first individual computing node consumes power while the first test job is performed on the first individual computing node;

storing the first rate in a first power profile as the first power-consumption-rate upper bound;

retrieving the first power-consumption-rate upper bound from the first power profile associated with the first application;

retrieving a second power-consumption-rate upper bound from a second power profile that is associated with the second application;

determining that a sum of the first power-consumption upper bound and the second power-consumption upper bound does not exceed a predefined power-consumption threshold for a cluster of computing nodes; and based on the determination that the sum does not exceed the predefined power-consumption threshold, performing the first job and the second job concurrently in the cluster of computing nodes by executing the first application and the second application.

18. The non-transitory computer-readable storage medium of claim 17, wherein the set of actions further comprises, prior to determining the sum:

performing a second test job by executing the second application on a second individual computing node in the cluster of computing nodes;

determining a second rate at which the second individual computing node consumes power while the second test job is performed on the second individual computing node; and storing the second rate in the second power profile as the second power-consumption-rate upper bound.

19. The non-transitory computer-readable storage medium of claim 17, wherein the set of actions further comprises:

determining an actual power-consumption rate at which an individual computing node in the cluster consumes power while the first job and the second job are performed concurrently in the cluster;

determining that the actual power-consumption rate exceeds the sum; and updating the first power-consumption-rate upper bound or the second power-consumption-rate upper bound based on the determination that the actual power-consumption rate exceeds the sum.

20. The non-transitory computer-readable storage medium of claim 19, wherein updating the first power-consumption-rate upper bound or the second power-consumption-rate upper bound comprises:

determining a difference by subtracting the sum from the actual power-consumption rate;

adding the difference to the first power-consumption-rate upper bound to determine an updated first power-consumption-rate upper bound;

adding the difference to the second power-consumption-rate upper bound to determine an updated second power-consumption-rate upper bound;

storing the updated first power-consumption-rate upper bound in the first power profile; and storing the updated second power-consumption-rate upper bound in the second power profile.

* * * * *